J. R. MOFFATT.
BINDER.
APPLICATION FILED NOV. 21, 1905.

1,110,705.

Patented Sept. 15, 1914.

3 SHEETS—SHEET 1.

Witnesses
F. L. Durand
Wm. J. Whalley

Inventor
James R. Moffatt
By
C. B. Sturtevant
Attorney

J. R. MOFFATT.
BINDER.
APPLICATION FILED NOV. 21, 1905.

1,110,705.

Patented Sept. 15, 1914.

3 SHEETS—SHEET 2.

J. R. MOFFATT.
BINDER.
APPLICATION FILED NOV. 21, 1905.
1,110,705.
Patented Sept. 15, 1914.
3 SHEETS—SHEET 3.
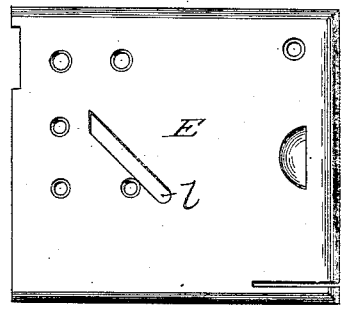
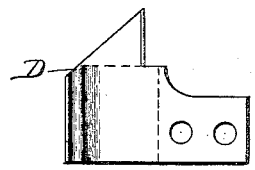
Fig. 8.
Fig. 9.
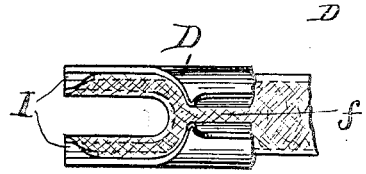
Fig. 10.
Fig. 14.
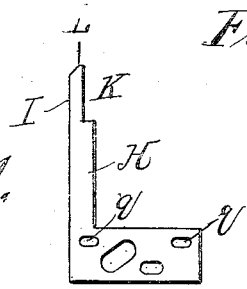
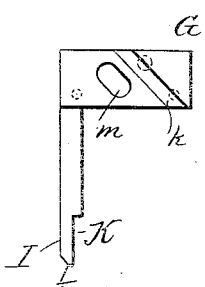
Fig. 11.
Fig. 12.
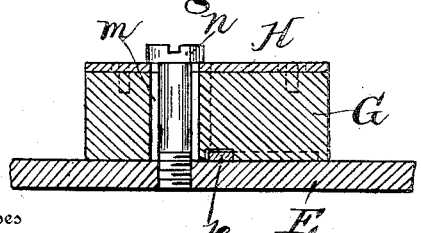
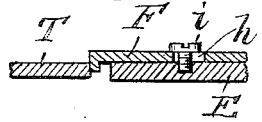
Fig. 15.
Fig. 13.
Witnesses
F. L. Ourand
Wm J. Whalley
Inventor
James R. Moffatt
C. D. Sturtevant
Attorney 1,110,705.

UNITED STATES PATENT OFFICE.

JAMES R. MOFFATT, OF CHICAGO, ILLINOIS, ASSIGNOR TO UNION SPECIAL MACHINE COMPANY, OF CHICAGO, ILLINOIS, A CORPORATION OF ILLINOIS.

BINDER.

Specification of Letters Patent. Patented Sept. 15, 1914.

Application filed November 21, 1905. Serial No. 288,429.

*To all whom it may concern:*

Be it known that I, JAMES R. MOFFATT, a citizen of the United States, residing at Chicago, in the county of Cook, State of Illinois, have invented certain new and useful Improvements in Binders, of which the following is a description, reference being had to the accompanying drawing, and to the letters and figures or reference marked thereon.

My invention relates to an improvement in devices for folding and guiding a band or strip to the stitch-forming mechanism of a sewing machine to be folded around the edge of a fabric, and stitched thereto as a binding strip.

The invention includes several novel features, all as hereinafter described and referred to in the appended claims.

Figure 1:
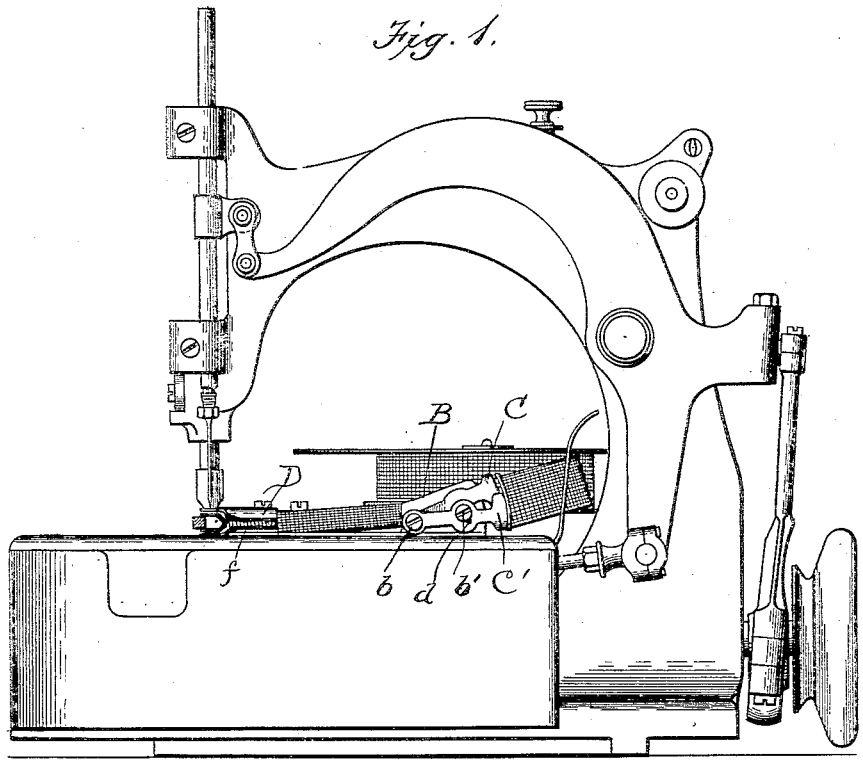
Figure 1A:
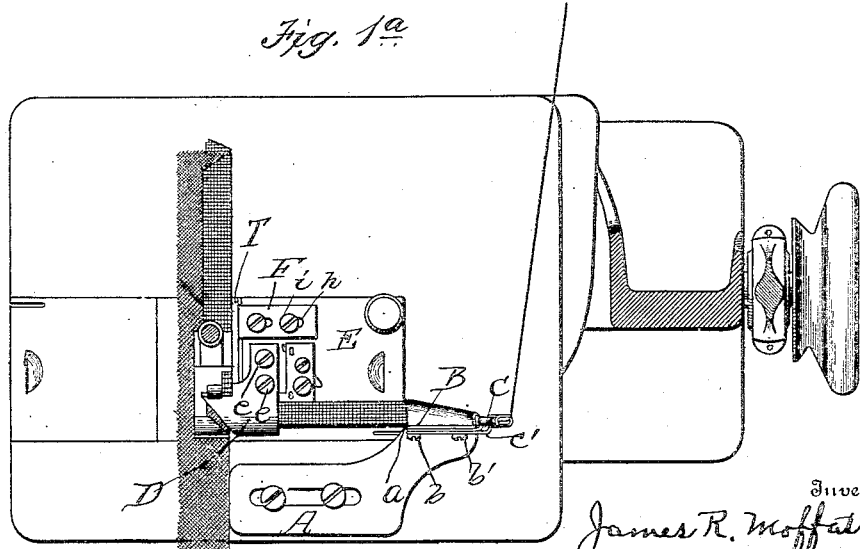
Figure 2:
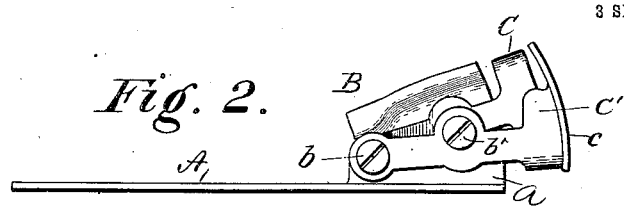
Figure 3:
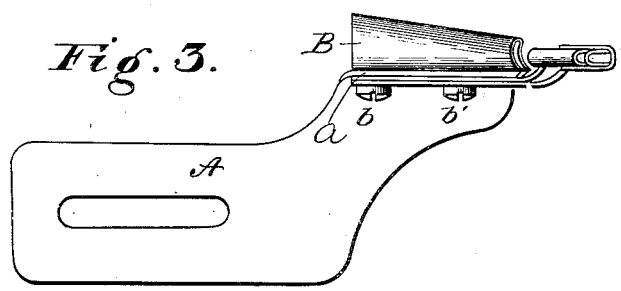
Figure 4:
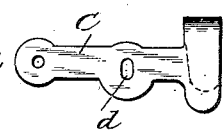
Figure 5:
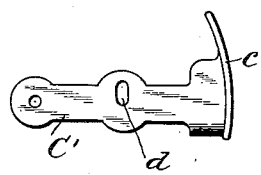
Figure 6:
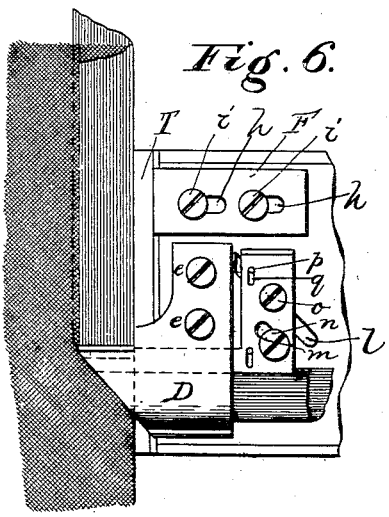
Figure 7:
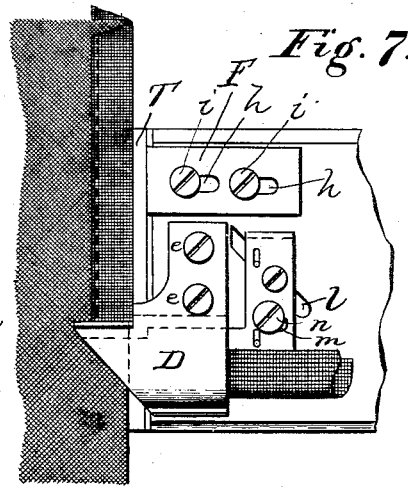

The invention is illustrated in the accompanying drawings in which,

Figure 1 is a front elevation of a sewing machine, showing my invention applied thereto; Fig. 1ª is a plan view of the same, partly in section; Fig. 2 is a front elevation of the folder and guide for the band before it reaches the binder; Fig. 3 is a plan view of the same; Figs. 4 and 5 are detail views illustrating the two overlapping plates; Fig. 6 is a plan view of the binder; Fig. 7 is a similar view of the same, the parts being in a different adjustment; Fig. 8 is a top plan view of the cloth plate slide of the machine; Fig. 9 is a top plan of the binder detached; Fig. 10 is a side view of the same; Fig. 11 is a plan view of one of the adjusting plates, detached; Fig. 12 is a bottom view of the other adjusting plate, detached; Fig. 13 is a sectional view showing the adjustable stop for positioning the binder; Fig. 14 is a front enlarged view, showing the fabric as it passes from the binder, and Fig. 15 is a section through the support for the edge guides coöperating with the binder.

The machine is of any well known construction, but herein is shown as of the Union Special single needle type. Upon the cloth plate is adjustably secured a plate A, carrying the preliminary folder and guide for the binding strip, which folder and guide is constructed as follows: Attached to the vertical flange $a$, by the screws $b$, $b'$, is the tapering folding guide B.

C, C', are overlapping guiding plates for the band, both having their shanks pivoted on the screw $b$ and adjustable to vary the size of the guiding opening formed by the overlapping of the plates by means of the elongated slots $d$. The plate C' has the flattened wire loop $c$, through which the band passes, the adjustability of the plates C, C', allowing for the guiding of varying widths of bands into the folding guide B.

D represents the binder proper, attached to the cloth plate slide E, by screws $e$, $e$. This binder instead of being solid at its front edge, as is customary, thus requiring the threading of the strip from the end, is self-threading, that is, has a slot $f$, with flaring walls, through which the upper and lower sides of the binding are inserted, above and below the solid central portion $g$, of the binder, the walls of the binder above and below the solid central portion being of spring material.

The binder is set to proper position to regulate the bite of the needle into the binding by means of a gage plate F. The binder as above noted is mounted upon and carried by the cloth plate slide E and it will therefore be obvious that if the slide plate E should be moved toward or from the needle that the position of the binding strip being stitched will also be altered and the bite of the needle into the binding strip determined. The gage plate F is adjustably attached to the sliding plate E by slot and screw connection $h$, $i$. This gage plate F has its forward end slightly bent downward so that when the cloth plate slide is moved toward the needle the end of the gage plate F will come in contact with the throat plate T of the machine and thus prevent the cloth plate slide from being moved further in a direction toward the needle. It will thus be seen that this gage plate F serves as a stop to limit the inward movement of the cloth plate slide and that said gage plate therefore serves as a means to position the binder relative to the needle and to regulate the bite of the needle into the binding.

By using a stop which limits the inward movement only of the sliding plate carrying the binder, I am able to freely move said sliding plate away from the stitching mechanism and presser foot without the detaching of the binder or any of its parts. This movement of the binder away from the stitching point is of especial advantage in turning sharp corners, as it is necessary to manipulate the binding by hand in turning a corner. By my structure above noted wherein the binder may be quickely moved away from the stitching point, the binding may be manipulated by hand and the binder then brought quickly back to the same operative position relative to the needles as the stop limits the inward movement of the slide. Then again, by mounting my binder on the movable cloth plate, said binder may be readily moved away from the right hand side of the needle with the cloth plate, and thus afford easy access to the looper for threading the same.

To adjust the binder to receive different widths of binding strips, I have provided the block G, having an inclined groove $k$ to fit the leather $l$, on the cloth plate slide and adjustable by means of the slot and screw connection $m$, $n$. Secured to this block by a screw $o$ and having limited lateral adjustment by pins and slots, $p$, $q$, is a plate H. The slot $m$ is, of course, wider than the shank of the screw $n$, to allow this adjustment of the plate H. The block G and plate H, have flat fingers I, adapted to fit respectively the recesses between the central portion $g$, of the binder and the lower and upper walls, so that by sliding the block G on its feather, these fingers are moved laterally to narrow or widen the binder recess, and thus to allow for narrower or wider binding strips. These fingers are cut away as at K, to conform to the shape of the binder adjacent the needle. This adjustment permits the proper folding and guiding of various widths of binding strips, and the lateral adjustment of the upper plate H, permits an adjustment of the upper and lower faces of the binder with respect to each other, whereby the upper face of the bound fabric may be covered to a greater or less extent than the lower face, and vice versa.

The feather on the cloth plate side, is arranged obliquely and parallel with the oblique face of the binder, and the forward reduced ends L of the finger I are also formed on the same angle, so that when the block G and plate H are bodily adjusted, the ends of the fingers I will move in a direction substantially parallel with the oblique delivery end of the binder. It is very essential that the fingers I should never project beyond the mouth of the binder as the fabric when leaving the binder is inverted so as to pass in a direction substantially at right angles to the direction which the binding strip or fabric passes through the binder and the edge of the binding strip will run over the end of the fingers I in making the turn.

Having thus described my invention, what I claim as new and desire to secure by Letters Patent, is:—

1. In a binding device, guiding walls forming a guiding space for the binding strip, the delivery end of said device being formed oblique to the path of movement of the edge of the fabric, and means operable in a direction parallel to said delivery end for adjusting the area of said guiding space.

2. In a binding device having its delivery end formed oblique to the path of movement of the edge of the fabric to be bound, and having a guiding space for the binding strip, and means for adjusting the width of said guiding space and maintaining the delivery end of the binding device free from projecting parts; substantially as described.

3. In a binding device having its delivery end formed oblique to the path of movement of the edge of the fabric to be bound and having a guiding space for the binding strip, means operable upon the upper and lower edges of the binding strip and adjustable in a direction parallel to the delivery end of the binder for adjusting the width of the space for the binding strip; substantially as described.

4. The combination in a sewing machine, of a needle, a throat plate, a cloth plate slide, a binding device mounted on said cloth plate slide and movable therewith, an adjustable stop carried by said cloth plate slide, and coöperating with said throat plate for positioning the binder relative to the needle.

5. In a sewing machine, a needle a cloth plate, a sliding plate mounted thereon a binding device attached to said sliding plate, an adjustable stop attached to the sliding plate, said sliding plate, binding device and adjustable stop adapted to move laterally to and from the needle; substantially as described.

6. In a binding device, having its delivery end formed oblique to the path of movement of the edge of the binding strip and having walls forming a guiding recess for the binding strip, guides in said recess to form the inner walls thereof, means for adjusting said guides in a direction parallel to the delivery end of said binding device, and means for relatively adjusting the guides with respect to each other; substantially as described.

7. In a binding device having its delivery end formed oblique with respect to the path of movement of the edge of the fabric to be bound and having a guiding recess, guides in said recess to form the inner walls thereof, means to adjust said guides horizontally and obliquely with a line parallel with the edge of the oblique delivery end; substantially as described.

8. In a binding device having its delivery end formed oblique with respect to the path of movement of the edge of the material to be bound, and having a guiding recess, adjustable guides in said recess and having their ends registering with the delivery end of the binding device formed on a line parallel with said delivery end, and also adjustable with respect to each other; substantially as described.

9. In combination with a binder, a preliminary folding and guiding device for the band, including a folding guide and overlapping guiding plates, adjacent the entrance thereof, pivoted on a common axis, and adjustable relative to each other; substantially as described.

10. In combination with a binder, a preliminary folding and guiding device for the band, including a folding guide and overlapping guiding plates adjacent the entrance thereof, pivoted on a common axis, and adjustable relative to each other, by means of registering elongated slots and a screw; substantially as described.

11. In combination with a binder, a preliminary folding and guiding device for the band, including a folding guide and overlapping guiding plates, adjacent the entrance thereof, pivoted on a common axis, and adjustable relative to each other, one of said plates carrying a flattened wire loop for the band; substantially as described.

12. A binder having a guiding recess with its delivery end formed oblique to the path of movement of the fabrics to be bound, guides in said recess to form the inner side walls thereof, and means for adjusting said guides bodily in an oblique plane conforming to the obliquity of the delivery end of the said guiding recess, and means for relatively adjusting the guides with respect to each other; substantially as described.

13. A binder having a guiding recess with its delivery end formed oblique to the path of movement of the fabrics to be bound, guides in said recess to form the inner side walls thereof, and means for adjusting said guides bodily in an oblique plane conforming to the obliquity of the delivery end of the said guiding recess, and means for relatively adjusting the guides with respect to each other, and an adjustable gage to vary the position of the binder with respect to the needle; substantially as described.

14. A binder having parallel walls forming a guiding recess for the upper and lower faces of the binding strip, an adjustable block, fingers carried by said block and located between the walls of said binder, means whereby said block may be adjusted, and means for adjusting the fingers relative to each other; substantially as described.

15. A binder having a recess for guiding the binding strip and having an oblique delivery end, a support in which said binder is secured, a block adjustable on said support in an inclined path parallel to the delivery end of the binder, and plates or fingers carried by said block fitting the recess and forming the inner side walls thereof; substantially as described.

16. A binder having a recess for guiding the binder strip, and having an oblique delivery end, a support on which said binder is secured, a block adjustable on said support in an inclined path parallel to the delivery end of the binder, and plates or fingers carried by said block fitting the recess and forming the inner side walls thereof, and having relative lateral adjustment; substantially as described.

17. A binder having a recess for guiding the binding strip, and having an oblique delivery end, a support on which said binder is secured, having an inclined guiding feather thereon, a block slidingly engaging said feather, a finger for the lower portion of the guiding recess, carried by said block, and an adjustable plate on said block carrying a second finger for the upper portion of the guiding recess; substantially as described.

18. The combination with a sliding plate, a binder mounted on said sliding plate, an adjustable stop carried by and movable with said sliding plate, and means coöperating with said adjustable stop, for positioning said sliding plate.

19. The combination in a sewing machine, of a needle, a throat plate, a cloth plate slide freely movable toward and from the throat plate, a binding device mounted on said cloth plate slide and movable therewith, said throat plate and cloth plate slide having an adjustable stop carried by one of the parts and coöperating with the other for positioning the cloth plate slide relative to the throat plate and thereby positioning the binding device relative to the needle, said stop permitting the free movement of the cloth plate slide away from the throat plate to give access to the material for turning corners and to expose the complemental stitching mechanism beneath the work support.

20. The combination in a sewing machine, of a needle, a throat plate, a cloth plate slide, freely movable toward and from the throat plate, a binding device mounted on said cloth plate slide and movable therewith, an adjustable stop for limiting the movement of the cloth plate toward the throat plate, for positioning the binder relative to the needle, said stop permitting the free movement of the cloth plate slide away from the throat plate to give access to the needle for turning corners and to expose the complemental stitching mechanism beneath the work support.

In testimony whereof I affix my signature, in presence of two witnesses.

JAMES R. MOFFATT.

Witnesses:
CHESTER McNEIL,
A. B. CLOTHIER.